United States Patent [19]

Sawamua et al.

[11] 4,367,921
[45] Jan. 11, 1983

[54] LOW POLARIZATION BEAM SPLITTER

[75] Inventors: Mitsuharu Sawamua, Yokohama; Susumu Ito, Tokyo, both of Japan

[73] Assignee: Canon Kabushiki Kaisha, Tokyo, Japan

[21] Appl. No.: 174,002

[22] Filed: Jul. 31, 1980

[30] Foreign Application Priority Data

Aug. 10, 1979 [JP] Japan .................. 54-102492

[51] Int. Cl.³ .................. G02B 5/28; G02B 27/10
[52] U.S. Cl. .................. 350/164; 350/171
[58] Field of Search ............ 350/164, 166, 171, 172, 350/173, 1.7

[56] References Cited

U.S. PATENT DOCUMENTS

| | | |
|---|---|---|
| 2,399,860 | 5/1946 | Dimmtick . |
| 2,815,695 | 12/1957 | Scharf et al. .............. 350/164 |
| 3,559,090 | 1/1971 | Refermat et al. ............ 350/164 |
| 4,179,181 | 12/1979 | Chang .................... 350/166 |

FOREIGN PATENT DOCUMENTS

| | | | |
|---|---|---|---|
| 2332254 | 1/1975 | Fed. Rep. of Germany ...... | 350/164 |
| 513745 | 8/1979 | U.S.S.R. ................. | 350/164 |

OTHER PUBLICATIONS

Fadeeva et al. E. I., *Sov. Jour. of Opt. Tech.*, vol. 42, No. 12, pp. 736–737, Dec. 1975.

Sokolova, R. S., *Sov. Jour. of Opt. Tech.*, vol. 37, No. 5, pp. 318–320, May, 1970.

*Primary Examiner*—Jon W. Henry
*Attorney, Agent, or Firm*—Fitzpatrick, Cella, Harper & Scinto

[57] ABSTRACT

A beam splitter is disclosed which comprises a transparent substrate plate, a first dielectric thin film layer laid on the substrate, a metallic thin film layer laid on the first dielectric layer and a second dielectric thin film layer laid on the metallic layer. At least one of the first and second dielectric layers is composed of a plural number of dielectric substance layers having different refractive indexes. At least one of the dielectric substance layers is of a dielectric substance having a refractive index less than 1.80.

9 Claims, 8 Drawing Figures

LOW POLARIZATION BEAM SPLITTER

BACKGROUND OF THE INVENTION

1. Field of the Invention

The present invention relates to a beam splitter which transmits light and reflects light in approximately equal quantities of light in the visible region. More particularly, the present invention relates to a low polarization beam splitter which can reduce the difference between polarized light components.

2. Description of the Prior Art

Many beam splitters conventionally used in the art are of the type comprising a dielectric multilayer film or a metallic single layer film. However, these types of beam splitter have various disadvantages. The first mentioned type of beam splitter comprising a dielectric multilayer film has a complicated film structure and is difficult to manufacture although it exhibits no absorption. The second mentioned type of beam splitter comprising a metallic single layer film such as a film of Ag is low in absorption and relatively easy to manufacture. But, the light transmitted through it and the light reflected by it in the visible region are not equal to each other in wavelength characteristics. When a metallic single layer film such as a film of Cr is used, the transmitted light and reflected light of the visible region will have nearly equal wavelength characteristics. However, in this case, the Cr layer has a disadvantage of high absorption.

An important drawback common to the beam splitter comprising a dielectric multilayer film and that comprising a metallic single layer is that the difference between polarized components of transmitted light and reflected light is large. A large difference between polarized light components often causes a problem in practical use of the beam splitter. For example, if a beam splitter having polarization is used in a photometer, then a variance of measured value will be caused by the large difference in polarization between lights from the object. Also, in case of an interferometer of the type in which the light transmitted through a beam splitter is reflected on an object and then reflected on the same beam splitter for observation, there is caused a substantial decrease of light quantity by the polarization of the beam splitter.

An example of low polarization beam splitter is disclosed in U.S. Pat. No. 3,559,090. This known beam splitter is a cube type beam splitter which is manufactured in the following manner:

At first, a dielectric film having a refractive index in the range of from 1.80 to 2.5 is vapour deposited on a prism and then a film of Ag is vapour deposited thereon. Subsequent to it, a second dielectric film having a refractive index in the same range as above is vapour deposited and lastly a prism is cemented thereto.

In view of arrangement of films, the above described beam splitter also involves some problems. Since prisms are used, the optimum refractive index required for the dielectric films to obtain the desired characteristics has to be changed with the change of refractive index of prisms then used. Therefore, there may occur such case where the dielectric film having a suitable refractive index is not available. The above arrangement of films can not be applied to a plate type beam splitter the outer medium of which is air. For a plate type beam splitter it is impossible to obtain the desired characteristics by using dielectric films having a refractive index in the range of from 1.80 to 2.5.

SUMMARY OF THE INVENTION

Accordingly, it is an object of the present invention to provide a beam splitter which has a reduced difference between the P polarized component and the S polarized component in each of the transmitted light and reflected light in the visible region of wavelength.

It is another object of the invention to provide a beam splitter which transmits light and reflects light in approximately equal quantities of light in the visible wavelength region.

It is a further object of the invention to provide a beam splitter which absorbs very little light over the visible wavelength region.

It is a still further object of the invention to provide a beam splitter which is easy to manufacture and which can be formed as a plate type beam splitter.

To attain the above objects according to the invention there is provided a beam splitter comprising a first dielectric thin film layer and a second dielectric thin film layer with a metallic layer being interposed therebetween. At least one of the first and second dielectric layers is composed of a plural number of thin film layers and at least one of the plural number of thin film layers is formed using a dielectric substance having a refractive index less than 1.80.

In the beam splitter according to the invention, the metallic layer is preferably a layer of silver. However, for some applications of the beam splitter, there also may be used aluminum to form the metallic layer. The beam splitter thus obtained according to the invention employing a layer of aluminum therein also exhibits sufficient performance for practical purposes.

The arrangement of layers according to the invention is useful not only for a cube type beam splitter in which the first and second layers together with a metallic layer interposed therebetween are sandwiched in between two transparent substrate plates, but also for a plate type beam splitter in which a transparent substrate plate is provided on either one of the two dielectric layers. In either case, the beam splitter according to the invention exhibits excellent performance.

One of the most important advantages of the beam splitter according to the invention is found in that the S polarized light component is essentially equal to the P polarized component in quantity of light over all the visible region ranging from 400 nm to 700 nm. More specifically, let Ts be the S polarized light component in the beam of light transmitted through the beam splitter, Tp be the P polarized component in the same beam of light, Rs be the S polarized light component in the beam of light reflected by the beam splitter and Rp be the P polarized component in the same beam of reflected light. Then the values of Ts and Tp are nearly equal to each other and the values of Rs and Rp are nearly equal to each other. Moreover, Ts and Rs can take values approximately equal to each other and Tp and Rp can take approximately equal values employing the beam splitter of the invention.

Other and further objects, features and advantages of the invention will appear more fully from the following description taken in connection with the accompanying drawings.

BRIEF DESCRIPTION OF THE DRAWINGS

FIG. 7 is a view similar to FIG. 1 showing the fourth embodiment of the invention; and FIG. 8 shows wavelength characteristic curves of the fourth embodiment.

DESCRIPTION OF THE PREFERRED EMBODIMENTS

Figure 1:
FIG. 1 schematically shows an arrangement of film layers in the beam splitter according to the first embodiment of the invention.

FIG. 1 illustrates a film arrangement in a cube type beam splitter having refractive index $ng=1.52$ according to the present invention. The wavelength characteristics thereof are shown in FIG. 2.

The shown first embodiment of beam splitter of the invention comprises five layers formed in the following procedure:

The first layer as numbered from the side of prism is a film layer of $TiO_2$ having refractive index $n_1=2.30$ and geometrical film thickness $d_1=20$ nm formed by vapour deposition. The second layer is a film layer formed using $Al_2O_3$ as the main component which has refractive index $n_2=1.68$. The second layer is also formed employing a vapour deposition technique and has film thickness $d_2=35$ nm. The third layer is a layer of Ag having film thickness $d_3=22$ nm formed by vapour deposition. The fourth layer is formed by vapour depositing a film having film thickness $d_4=35$ nm the main component of which is $Al_2O_3$ having refractive index $n_4=1.68$. The fifth layer is a film of $TiO_2$ having film thickness $d_5=20$ nm and refractive index $n_5=2.30$ formed by vapour deposition. Finally, this multilayer structure is cemented together with a bonding agent having refractive index $ne=1.56$ (trade name: Apon).

Figure 2:
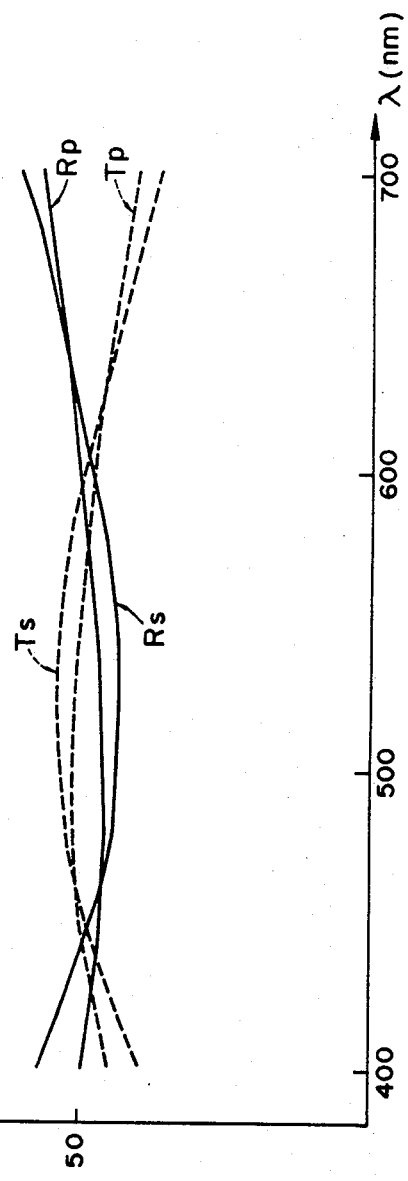
FIG. 2 shows wavelength characteristic curves of the beam splitter shown in FIG. 1.

When light was projected on the beam splitter from the ng side at an incidence angle of 45° as shown in FIG. 1, there were obtained wavelength characteristic curves shown in FIG. 2 in which wavelength λ is plotted on the abscissa and reflection factor R and transmission factor T on the ordinate. Solid line curves are of polarized light components of Rs and Rp and broken line curves are of those of Ts and Tp. It will be readily understood from FIG. 2 that the beam splitter obtained in accordance with the first embodiment of the invention is a beam splitter which exhibits almost no polarization throughout the visible region ranging from 400 nm to 700 nm. The wavelength characteristic of the transmitted light is nearly equal to that of the reflected light, which demonstrates the fact that the beam splitter is a well-balanced beam splitter. Also, because of low absorption the beam splitter is a bright beam splitter.

Figure 3:
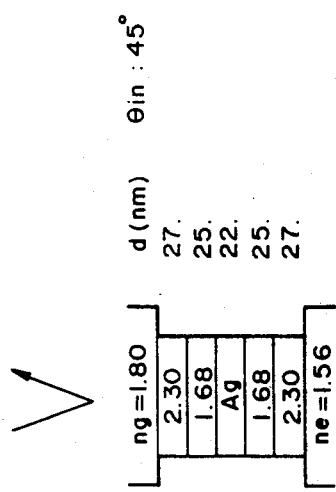
FIG. 3 is a view similar to FIG. 1 showing the second embodiment of the invention.
Figure 4:
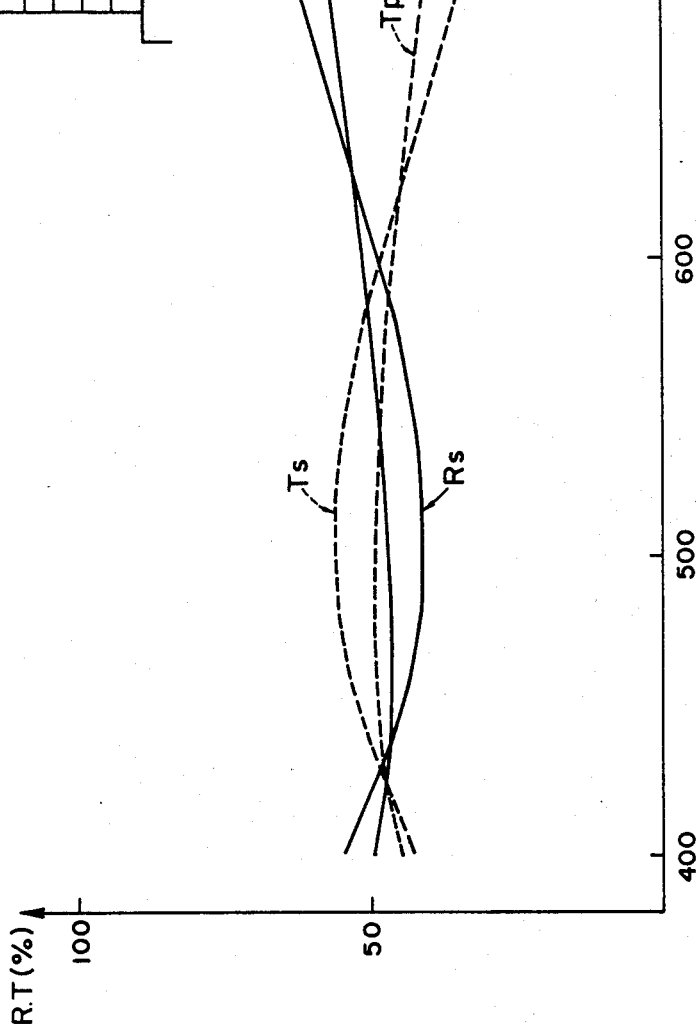
FIG. 4 shows wavelength characteristic curves of the second embodiment.

FIG. 3 shows the second embodiment of the invention in which the cube type beam splitter has refractive index $ng=1.80$. The wavelength characteristics thereof are shown in FIG. 4. Like the first embodiment, the multilayer structure of the second embodiment comprises five layers having the same refractive indexes as in the first embodiment. Comparing the second embodiment with the first one, it is seen that the refractive index ng of the prism used is changed from 1.52 to 1.80. In conformity with this change in refractive index of the prism, the film thickness of two layer equivalent film composed of the first and second layers is changed. Namely, in the second embodiment, $d_1=27$ nm and $d_2=25$ nm. Similarly, in the second embodiment, $d_4=25$ nm and $d_5=27$ nm. As seen from FIG. 4, the wavelength characteristic curves obtained from the second embodiment are essentially the same as those obtained from the first embodiment.

In this manner, according to the invention, the desired characteristics of a beam splitter can be obtained only changing the film thickness of two layer equivalent film for different refractive indexes of the prism. There is no need of altering the refractive index of dielectric film layers. The film thickness of the two layer equivalent film should be determined in such manner that the sum of the respective layers in optical film thickness be about λ/4 (λ=350–700 nm).

Figure 5:
FIG. 5 is a view similar to FIG. 1 showing the third embodiment of the invention.

FIG. 5 shows a film arrangement of a plate type beam splitter having refractive index $ng=1.52$ according to the invention.

Figure 6:
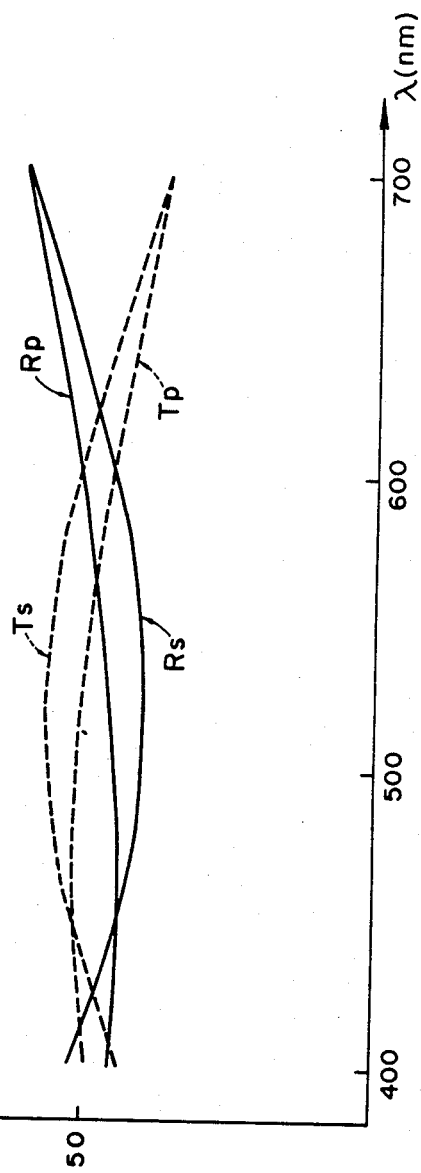
FIG. 6 shows wavelength characteristic curves of the third embodiment.

FIG. 6 shows wavelength characteristic curves thereof.

In this third embodiment, the first layer as numbered from the ng side is a layer having $n_1=2.30$ and film thickness $d_1=20$ nm. The second layer is a layer of $n_2=1.68$ and $d_2=30$ nm. The third layer is a film of Ag having film thickness $d_3=22$ nm and the fourth layer is a film of refractive index $n_4=1.38$ and film thickness $d_4=95$ nm. When light was projected on the plate type beam splitter having the above four layer structure at an incidence angle of 45° as shown in FIG. 5, there were obtained wavelength characteristic curves as shown in FIG. 6. It will be readily seen from FIG. 6 that like the first embodiment shown in FIG. 1, the third embodiment also provides a well-balanced and bright beam splitter which exhibits almost no polarization and absorbs light very little. The transmitted light and reflected light are nearly equal to each other in wavelength characteristics.

A single layer film of Ag is generally poor in durability. However, according to the invention such a film of Ag is disposed sandwiched in between two dielectric layers and therefore the durability of Ag film is remarkedly improved.

FIG. 7 shows the fourth embodiment of the invention in which the above described arrangement of films is applied to a beam splitter having refractive index $ng=1.80$. The wavelength characteristics thereof are shown in FIG. 8.

Like the third embodiment shown in FIG. 5, the fourth embodiment has a four layer structure. The four layers from the first to the fourth are entirely the same as those in the third embodiment in refractive index. But, in film thickness, the former is different from the latter. On account of the change in refractive index of the substrate then used, the film thickness of the two layer equivalent film composed of the first and second layers is changed accordingly. Namely, in the fourth embodiment, $d_1=25$ nm and $d_2=25$ nm. As seen from FIG. 8, the characteristics of the fourth embodiment are comparable to those of the third embodiment shown in FIG. 6. In this manner, according to the invention, the desired characteristics can be obtained for different refractive indexes of substrate only by changing the film thickness of the two layer equivalent film and without any need of the refractive index of the dielectric film layer being changed.

While the present invention has been particularly shown and described with reference to preferred embodiments thereof, it is to be understood that various modifications and changes may be made therein. For example, the film of $TiO_2$ having a refractive index of 2.3 may be replaced by another film having a refractive index higher than 1.80 such as a film ZnS, $CeO_2$ or $ZrO_2$. Also, the film having a refractive index of 1.68 whose main component is $Al_2O_3$ may be replaced by another film having a refractive index less than 1.80 such as a film of $SiO_2$ or $MgF_2$. It is also possible in light of the above teachings to replace the two layer equivalent film shown in the embodiments by a three layer equivalent film constituted of dielectric substance layer having a refractive index higher than 1.80 and dielectric layers having a refractive index less than 1.80. Also, the film of Ag may be replaced by other metallic film such as film of aluminum. For those skilled in the art it will be very easy to extend the application range of the present invention up to a wavelength region other than the visible region such as a region including the infrared region.

What we claim is:

1. A beam splitter comprising:
   a transparent substrate plate;
   a first thin filmlayer of a dielectric substance laid on said substrate and comprising a plural number of component layers having different refractive indexes, at least one said component layer having a refractive index less than 1.8, and the sum of the optical film thickness of said component layers being about $\lambda/4$, wherein $\lambda$ is a wavelength between 350 nm and 700 nm;
   a metallic thin film layer laid on said first thin film layer; and
   a second thin film layer of a dielectric substance laid on said metallic thin film layer.

2. A beam splitter according to claim 1, wherein said metallic thin film layer is of silver.

3. A beam splitter comprising:
   a transparent substrate plate;
   a first thin film layer of dielectric substance laid on said substrate and comprising a plural number of component layers having different refractive indexes, at least one said component layer having a refractive index less than 1.8, and the sum of the optical film thickness of said component layers of said first thin film layer being about $\lambda/4$, wherein $\lambda$ is a wavelength between 350 nm and 700 nm;
   a metallic thin film layer laid on said first dielectric thin film layer; and
   a second thin film layer of dielectric substance laid on said metallic thin film layer and comprising a plural number of component layers having different refractive indexes, at least one said component layer of said second thin film layer having a refractive index less than 1.8, and the sum of the optical film thicknesses of said component layers of said second thin film layer being about $\lambda/4$.

4. A beam splitter according to claim 3, wherein said metallic film layer is of silver.

5. A beam splitter comprising:
   a transparent substrate plate;
   a first thin film layer of dielectric substance laid on said substrate;
   a metallic thin film layer laid on said first dielectric thin film layer; and
   a second thin film layer of dielectric substance laid on said metallic thin film layer and comprising a plural number of component layers having different refractive indexes, at least one said component layer having a refractive index less than 1.8, and the sum of the optical thicknesses of said component layers being about $\lambda/4$, wherein $\lambda$ is a wavelength between 350 nm and 700 nm.

6. A beam splitter according to claim 5, wherein said metallic layer is of silver.

7. A beam splitter comprising:
   a transparent substrate plate;
   a first layer of dielectric substance having a refractive index higher than that of said substrate, and laid on said substrate;
   a second layer of dielectric substance having a refractive index less than 1.8 and laid on said first layer, the sum of the optical thicknesses of said first and said second layers being about $\lambda/4$, wherein $\lambda$ is a wavelength between 350 nm and 700 nm;
   a metallic thin film layer laid on said second layer;
   a third layer of dielectric substance having a refractive index less than 1.8 and laid on said metallic layer; and
   a fourth layer of dielectric substance laid on said third layer and having a refractive index higher than that of an outer medium with which said fourth layer is in contact at the side thereof opposite said third layer, the sum of the optical thicknesses of said third and fourth layers being about 80/4.

8. A beam splitter according to claim 7, wherein the refractive index of said first layer is equal to that of said fourth layer and the refractive index of said second layer is equal to that of said third layer.

9. A beam splitter comprising:
   a transparent substrate plate;
   a first layer of dielectric substance laid on said substrate and having a refractive index higher than that of said substrate;
   a second layer of dielectric substance laid on said first layer and having a refractive index less than 1.8, and the sum of the optical thicknesses of said first and second layers being about $\lambda/4$ wherein $\lambda$ is a wavelength between 350 nm and 700 nm;
   a metallic thin film layer laid on said second layer; and
   a third layer of dielectric substance laid on said metallic layer and having a refractive index less than 1.8, said third layer being in contact with air as an outer medium.

* * * * *

UNITED STATES PATENT AND TRADEMARK OFFICE
CERTIFICATE OF CORRECTION

PATENT NO. : 4,367,921

DATED : January 11, 1983

INVENTOR(S) : MITSUHARU SAWAMURA, ET AL.

It is certified that error appears in the above-identified patent and that said Letters Patent is hereby corrected as shown below:

TITLE PAGE

Item [75] (Inventors)

Change "Sawamua" to --Sawamura--.

Column 6, line 40
(Claim 7, last line)

Change "80/4" to --$\lambda/4$--.

Signed and Sealed this

Fifth Day of July 1983

[SEAL]

Attest:

GERALD J. MOSSINGHOFF

Attesting Officer

Commissioner of Patents and Trademarks